(12) United States Patent
Tseng

(10) Patent No.: US 11,688,870 B2
(45) Date of Patent: Jun. 27, 2023

(54) FUEL CELL ENERGY CIRCULATIVE UTILIZATION SYSTEM

(71) Applicant: ELECTRIC ENERGY EXPRESS CORPORATION, Zubei (TW)

(72) Inventor: Ling-Yuan Tseng, Zubei (TW)

(73) Assignee: Electric Energy Express Corporation, Zubei (TW)

( * ) Notice: Subject to any disclaimer, the term of this patent is extended or adjusted under 35 U.S.C. 154(b) by 169 days.

(21) Appl. No.: 17/443,144

(22) Filed: Jul. 21, 2021

(65) Prior Publication Data
US 2022/0228276 A1 Jul. 21, 2022

(30) Foreign Application Priority Data

Jan. 15, 2021 (TW) .................................. 110101720

(51) Int. Cl.
*H01M 8/0656* (2016.01)
*H01M 8/0202* (2016.01)
(Continued)

(52) U.S. Cl.
CPC ............. *H01M 8/0656* (2013.01); *C25B 1/04* (2013.01); *C25B 15/08* (2013.01);
(Continued)

(58) Field of Classification Search
CPC .. C25B 5/00; C25B 1/04; C25B 1/042; C25B 9/70; C25B 15/02; C25B 15/023; C25B 15/08; H01M 8/0656
See application file for complete search history.

(56) References Cited

U.S. PATENT DOCUMENTS

| 10,494,728 B2 | 12/2019 | Jakobsson et al. |
| 2006/0068248 A1* | 3/2006 | Ruhl ..................... H01M 8/186 429/444 |

(Continued)

FOREIGN PATENT DOCUMENTS

| JP | 5738983 B2 | 6/2015 |
| JP | 2018174115 A | 11/2018 |

(Continued)

*Primary Examiner* — Nicholas A Smith
(74) *Attorney, Agent, or Firm* — Rosenberg, Klein & Lee

(57) ABSTRACT

A fuel cell energy circulative utilization system includes an input energy, a first electric cell having an electricity output terminal and an energy output terminal, a second electric cell having an electricity input terminal, an energy input terminal, and an energy output terminal, and an energy circulation control device connected among the first and second electric cells and the input energy. The input energy includes an energy source containing hydrocarbons or hydrogen and connected to an energy input port of the first electric cell in order to make the first electric cell outputs electricity through the electricity output terminal and energy products of thermal energy and water through the energy output terminal. The electricity output terminal and the energy output terminal for thermal energy and water of the first electric cell are respectively connected to the electricity input terminal and the energy input terminal of the second electric cell, in order to make the second electric cell to at least output a hydrogen source through the energy output terminal thereof to the energy circulation control device, so that the energy circulation control device controls circulation of hydrogen for feeding to the energy input terminal of the first electric cell for reuse. The energy circulation control device is also operable to switch operations of the first and second electric cells between working modes of solid oxide electrolysis cell and solid oxide fuel cell.

24 Claims, 7 Drawing Sheets

(51) Int. Cl.
*H01M 8/04537* (2016.01)
*H01M 8/0612* (2016.01)
*C25B 1/04* (2021.01)
*C25B 15/08* (2006.01)

(52) U.S. Cl.
CPC ..... *H01M 8/0269* (2013.01); *H01M 8/04604* (2013.01); *H01M 8/0612* (2013.01)

(56) References Cited

U.S. PATENT DOCUMENTS

2006/0222912 A1\* 10/2006 Smith .................. H01M 8/186
429/417
2012/0208100 A1\* 8/2012 Suyama .............. C04B 38/0022
264/29.7

FOREIGN PATENT DOCUMENTS

| | | |
|---|---|---|
| JP | 2019507718 A | 3/2019 |
| TW | I559610 B | 11/2016 |
| TW | I708955 B | 11/2020 |
| WO | 2016000957 A1 | 1/2016 |

\* cited by examiner

FUEL CELL ENERGY CIRCULATIVE UTILIZATION SYSTEM

BACKGROUND OF THE INVENTION

1. Field of the Invention

The present invention relates to a fuel cell energy circulative utilization system, and in particular to a system applicable to a combination of an SOFC (solid oxide fuel cell) cell and an SOEC (solid oxide electrolysis cell) cell and including at least one energy circulation and switch system to switch the SOEC cell to supply at least one for example energy product of hydrogen for feeding back to the SOFC cell for use as energy input.

2. The Related Arts

Green energy is the focus of the century in respect of electricity generation or energy reuse. Particularly, all the countries around the world have been fully devoted themselves to the development of green energy policy and also due to the influence of waking of environmental protection in respect of the urgent need for improving air pollution, electric vehicles, such as electric motorcycles and electric cars that are of the greatest numbers, have been gradually increased in respect of the number thereof year by year. Thus, circulative utilization of the green energy is apparently of vital importance. This is because, in addition to the household electricity consumption, there is also a need for generation and supply of electricity for charging the electric vehicles or energy storage. However, if this results in insufficiency of electricity supply and a vicious cycle begins due to reliance on fossil fuel power generation that causes high pollution or natural gas power generation, the effectiveness and expectation of green energy would deteriorate.

The most commonly used ways of green energy electricity generation include nuclear energy, hydraulic energy, wind energy, solar energy, geothermal energy, or tidal energy. Taking nuclear energy as an example, although the capacity of electricity generation is relatively great and no requirement for frequent supply of energy, the nuclear wastes produced by the nuclear electricity generation plants would cause expensive costs for storage of such wastes and the used equipment and facility after the unclear electricity generation plants are shut down. Further, nuclear pollution issues, such as Fukushima Daiichi nuclear disaster of Japan, are extremely hard to handle. As such, nuclear energy is still of a great concern in respect of safety, and is virtually impossible for development and use in certain green and anti-nuclear area. This limits the industrial use of nuclear energy.

Concerning other green energy electricity generation, such as hydraulic energy, wind energy, solar energy, geothermal energy, and tidal energy, they are subject to severe limitations in respect of geographic locations, weather, temperature, seasons, or sea bed terrains, and are not easy to install. Thus, such green energy electricity generation modes of hydraulic energy, wind energy, solar energy, geothermal energy, and tidal energy provide electricity generation capacity that is very limited, and can only serve as an auxiliary system of electricity generation, and cannot be used as a primary system of electricity generation. Thus, the major electricity generation systems that are currently used are limited to thermal power generation or nuclear power generation, which are of high environmental pollution or high risk to health. Further, such green energy electricity generation modes of hydraulic energy, wind energy, solar energy, geothermal energy, and tidal energy provide only one single function of electrical energy output and does not have a synergic effect involving production of other types of energy products and circulative utilization of energy. Further, such green energy electricity generation modes of hydraulic energy, wind energy, solar energy, geothermal energy, and tidal energy require a great cost for maintenance. For example, a dam that is used for hydraulic electricity generation may quickly get sedimentation and thus shortening the service life thereof; the high-rise wind electricity generation facility is hard to maintain; the solar panels require constant and frequent cleaning to ensure an expected power conversion rate; the geothermal electricity generation facility has to severely control instantaneously jetting of a large amount of geothermal energy; and the tidal power generation facility virtually lasts long for service. These are all factors that limit the development and use of the green energy electricity generation modes.

Further, concerning the new generation of known solid oxide fuel cell (SOFC) serving as a primary electricity generation system, it requires constant supply of a large amount of hydrocarbon or hydrogen resources, such as natural gas, into the SOFC to maintain uninterrupted generation of electricity in the SOFC. Electricity generation based on SOFC is such that even in a time interval of off-peak hours requiring just a low load capacity, cutting off the supply of hydrocarbon or hydrogen source does not result in an immediate reduction of performance of the SOFC, and instead, electricity generation will maintain until the chemical reaction that generates electricity in the SOFC gradually slows down. This would lead to a great waste of electricity generated thereby. Further, if such an extra amount of electricity has to be stored, additional facility must be built up for storage of electricity. This requires additional costs of installation and human labor. If consideration is made in respect of cutting off the supply of hydrocarbon or hydrogen source in advance before the off-peak hours for the purposes of avoiding such an extra amount of electricity so generated, there would be an issue of insufficient supply of electricity if incorrect calculation of the timing of cutting off the supply of the hydrocarbon or hydrogen source into the SOFC is made due to the loading resulting from user end power consumption being variable day after day, and this would cause an embarrassing situation of blackout in a local region or even in the whole area. This deteriorates the utilization performance and practical value of SOFC based electricity generation, and leads to lacking of economic value of industrial use. This is an issue that has to be handled in respect of electricity generation based on solid oxide fuel cells.

Further, patent documents in the related field are known, such as Japan laid open patent No. 2018-174115, which discloses an electrochemical component, electrochemical module, an electrochemical device, an energy system, a solid oxide fuel cell, and a method for manufacturing an electrochemical component, in which a solid oxide fuel cell structure of which the electrochemical mechanism is complicated and the cost is high is disclosed for improving the electrochemical performance. However, the solution of the document still suffers the same issue and problem as that of the prior art fuel cell that the timing of cutting off the supply of energy is hard to control. Such a Japan patent document teaches, in paragraph [0031], based on the characterizing features discussed above, due to the inclusion of an electrochemical device and a discharged heat utilization portion for reusing the heat discharged from the electrochemical device, it is possible to provide an energy system that realizes durability/reliability and excellent performance and also achieves excellent energy efficiency, and further, a combination with an electricity generation system that generates electricity by using combustion heat of unused fuel gas discharged from the electrochemical device, a hybrid system that has excellent energy efficiency can be formed. It also teaches, in paragraph [0098], in place of the discharged heat utilization portion, a reaction waste gas utilization portion can be arranged to use a reaction waste gas discharged *without burning) from the electrochemical module M, and the reaction waste gas contains residual hydrogen that has not been used in reaction in the electrochemical component E, and the reaction waste utilization portion uses the residual hydrogen to achieve effective utilization of energy according to use of the burning heat or according to electricity generation of fuel cell. Based on such disclosure, the Japan patent document provides circulative utilization of fuel gas, such as residual hydrogen from reaction inside the SOFC; however, the effectiveness of circulative utilization of the entire resources is not good at all. Further, using a non-traditional, special fuel cell having a complicated structure and expensive cost to trade for circulative utilization of the residual fuel gas of hydrogen of a small amount and low circulative utilization efficiency is not of economic value for industrial use, and would oppositely causes a concern in respect of such a redundant structure occupying valuable space of the fuel cell, this being of no value at all.

Further, Japan patent No. 5738983 provides a method for operating a high-temperature fuel cell stack, in which a method for protecting an anode of a high-temperature SOFC or molten carbonate fuel cell (MCFC) included in an electricity generation system from oxidization by applying an external voltage to the fuel cell is provided, for the purpose of keeping the electromotive force of the fuel cell in a safe range. Similarly, in addition to the issues and problems of the known solid oxide fuel cell in respect of resources waste for electricity generation and unexpected blackout resulting from timing of cutting off supply of hydrocarbon or hydrogen source being hard to handle, such a fuel cell needs application of an external voltage to offer protection to the fuel cell, this requiring consumption of additional energy, so that in addition to being incapable of fully exploiting the energy of the fuel cell in the entirety thereof, extra electricity resources and cost must be consumed, and this makes it not of value for industrial use.

PCT Patent No. WO2016000957 A1 discloses an efficient AC-DC electrical power converting unit configuration, in which a stack of the same type solid oxide electrolysis cells or a stack of the same type fuel cells is simply used to make AC-DC or DC-DC conversion and output for extra electricity. The PCT document still suffers the problems and drawbacks of the known solid oxide fuel cell or solid oxide electrolysis cell that it is necessary to make conversion and conveyance of electricity to other DC loading or energy storage, in case of extra electricity produced. Further, the conversion process of DC-DC or AC-DC conversion adopted in the PCT document needs additional installation cost, making it not economic. Further, the DC-DC or AC-DC conversion process also causes additional loss of energy, making the entire energy utilization poor. Further, utilization of energy achieved with the SOEC stack or the stack of the same type fuel cell according to the PCT document is generally limited to use of extra electrical energy, and this constrains the value and scope of industrial use thereof.

In addition, Taiwan Patent No. 1559610 that provides a solid oxide electrolysis fuel cell test device, Taiwan Patent No. 1708955 that provides a solid oxide electrolysis fuel cell test device and a hydrogen generation device, U.S. Pat. No. 10,494,728 that provides a process for producing CO from CO2 in a solid oxide electrolysis cell, and Japan patent No. 2019-507718 that provides a method for optimized generation of carbon monoxide based on SOCE, all relate to methods for generation of resources of hydrogen, carbon dioxide, and carbon monoxide by using solid oxide electrolysis cell. The solutions of such patent documents require additional supply of electrical energy for conversion and generation of resources, such as hydrogen, carbon dioxide, and carbon monoxide. Such resources are used to fill into hydrogen storage canisters, carbon dioxide storage canisters, and carbon monoxide storage canisters and are generally one-way resources generation of hydrogen, carbon dioxide, and carbon monoxide, making it not possible to fully exploit all resources provided in SOECs, thereby limiting the industrial use and application of the SOCEs in only a narrow scope of resources generation. This does not suit the need of economic value of industrial use.

SUMMARY OF THE INVENTION

The primary objective of the present invention is to provide a fuel cell energy circulative utilization system, which helps eliminate the problems and drawbacks of the prior art technology and those of the patent documents discussed above that the known solid oxide fuel cells might cause waste of resources or potential issue of unexpected power failure due to being incapable of effective control in respect of timing for cutting off input sources of hydrocarbon or hydrogen resources at off-peak hours of power generation, and also helps to eliminate the problems and drawbacks of the above patent documents that the known solid oxide electrolysis cells may generate single type of resources of for example hydrogen, carbon monoxide, and carbon dioxide, but do not enable such single type of resources of resources that are produced as unidirectional resources generation to be used in wide applications in the industry.

As such, the present invention provides a fuel cell energy circulative utilization system, which comprises:

at least one input energy, which is an energy source containing hydrocarbons or hydrogen;

at least one first electric cell, the first electric cell comprising at least one energy input terminal, an electricity output terminal, and at least one energy output terminal, the energy input terminal being connected with the input energy, so as to have the electricity output terminal generating and outputting electricity and to have the energy output terminal generating and outputting thermal energy and water;

at least one second electric cell, the second electric cell comprising at least one electricity input terminal, an energy input terminal, and an energy output terminal, the electricity input terminal and the energy input terminal being respectively connected with the electricity output terminal and the energy output terminal of the first electric cell to respectively input the electricity and the thermal energy and water output from the first electric cell so as to have the energy output terminal of the second electric cell output at least a hydrogen source; and at least one energy circulation control device, the energy circulation control device being connected among the energy input terminal, the electricity output terminal, and the energy output terminal of the first electric cell and the electricity input terminal, the energy input terminal, and the energy output terminal of the second electric cell, in order to manipulate and control the hydrogen source output from the energy output terminal of the second electric cell for feeding back to the energy input terminal of the first electric cell, the energy circulation control device being operable for controlling and switching the first electric cell and the second electric cell between working modes as a solid oxide electrolysis cell (SOEC) or a solid oxide fuel cell (SOFC).

Further, in the above fuel cell energy circulative utilization system according to the present invention, the input energy the input energy is formed of a natural gas source.

In the above fuel cell energy circulative utilization system according to the present invention, the input energy is formed of a biogas source.

In the above fuel cell energy circulative utilization system according to the present invention, the input energy is formed of a blue hydrogen source.

In the above fuel cell energy circulative utilization system according to the present invention, the input energy is formed of a green hydrogen source.

In the above fuel cell energy circulative utilization system according to the present invention, the input energy comprises a source containing hydrocarbons and is connected with at least one reformer, the reformer comprising a first output terminal and a second output terminal, wherein the reformer is operable to separate the input energy that contains hydrocarbons into hydrogen and carbon dioxide to be respectively output through the first output terminal and the second output terminal, the first output terminal of the reformer being connected with at least one input control valve, the input control valve having an end connected with one end of the energy circulation control device connected with the energy input terminal of the first electric cell to control the hydrogen output from the first output terminal of the reformer to flow through the energy circulation control device and the energy input terminal of the first electric cell to input into the first electric cell or not, one energy output terminal of the first electric cell outputting carbon dioxide, the second output terminal of the reformer being connected with the energy output terminal of the first electric cell that outputs carbon dioxide to jointly output carbon dioxide.

In the above fuel cell energy circulative utilization system according to the present invention, the first electric cell is formed of a SOFC, and the first electric cell is operable in the SOFC working mode.

In the above fuel cell energy circulative utilization system according to the present invention, the electricity output terminal of the first electric cell is connected with at least one microgrid.

In the above fuel cell energy circulative utilization system according to the present invention, the energy output terminal of the first electric cell outputs carbon dioxide.

In the above fuel cell energy circulative utilization system according to the present invention, each energy output terminal of the first electric cell is connected with at least one greenhouse to supply sources of water and carbon dioxide output through the energy output terminal into the greenhouse to be used therein.

In the above fuel cell energy circulative utilization system according to the present invention, the second electric cell is formed of a SOFC and the second electric cell is operable in the SOEC working mode.

In the above fuel cell energy circulative utilization system according to the present invention, the electricity input terminal of the second electric cell is connected with at least one commercial electricity source.

In the above fuel cell energy circulative utilization system according to the present invention, the electricity input terminal of the second electric cell is connected with at least one renewable energy source.

In the above fuel cell energy circulative utilization system according to the present invention, the renewable energy source with which the electricity input terminal of the second electric cell is connected is formed of at least one of solar panel generated electricity source, wind power generation electricity source, hydraulic power generation electricity source, geothermal power generation electricity source, and tidal power generation electricity source.

In the above fuel cell energy circulative utilization system according to the present invention, the energy input terminal of the second electric cell is connected with at least one water storage tank, and the water storage tank is provided with a control valve to control supply of water to the energy input terminal.

In the above fuel cell energy circulative utilization system according to the present invention, one energy output terminal of the second electric cell outputs oxygen, and the energy output terminal is connected with at least one greenhouse to supply the oxygen source output from the energy output terminal to the greenhouse to be used therein.

In the above fuel cell energy circulative utilization system according to the present invention, the energy circulation control device comprises:

at least one first flow direction controller and second flow direction controller, the first flow direction controller and the second flow direction controller being arranged pairwise and connected in parallel between the energy input terminal and the energy output terminal of the first electric cell and the energy input terminal and the energy output terminal of the second electric cell, the first flow direction controller and the second flow direction controller being operable to control flow directions in opposite directions so as to control flow directions at the energy input terminal and the energy output terminal of the first electric cell and the energy input terminal and the energy output terminal of the second electric cell for inputting or outputting;

at least one electricity direction control unit, which is connected between the electricity output terminal of the first electric cell and the electricity input terminal of the second electric cell, in order to control a flow direction of electricity to be a flow direction of electricity (electrical current) between the electricity output terminal of the first electric cell and the electricity input terminal of the second electric cell; and at least one central control unit, which is electrically connected with the first flow direction controller, the second flow direction controller, and the electricity direction control unit, in order to control flow directions of energy of the first flow direction controller, the second flow direction controller, and the electricity direction control unit for inputting or outputting and a flow direction of electricity, so as to individually control and switch the first electric cell and the second electric cell to the SOEC or SOFC working mode.

In the above fuel cell energy circulative utilization system according to the present invention, the first flow direction controller of the energy circulation control device comprises at least one first electromagnetic valve and a first non-return valve connected in series.

In the above fuel cell energy circulative utilization system according to the present invention, the second flow direction controller of the energy circulation control device comprises at least one second electromagnetic valve and a second non-return valve connected in series.

In the above fuel cell energy circulative utilization system according to the present invention, at least one pairwise arranged and parallel connected first flow direction controller and second flow direction controller of the energy circulation control device that is connected with the energy output terminal of the second electric cell that outputs hydrogen has an end connected to at least one high-pressure hydrogen storage tank.

In the above fuel cell energy circulative utilization system according to the present invention, the high-pressure hydrogen storage tank to which the end of at least one pairwise arranged and parallel connected first flow direction controller and second flow direction controller of the energy circulation control device that is connected with the energy output terminal of the second electric cell that outputs hydrogen is connected is provided with at least one anti-explosion electromagnetic valve.

In the above fuel cell energy circulative utilization system according to the present invention, the pairwise arranged and parallel connected first flow direction controller and second flow direction controller of the energy circulation control device have logics of opening/closing that are opposite to each other so as to be similar to an exclusive-OR gate (XOR gate) of electronics.

In the above fuel cell energy circulative utilization system according to the present invention, the central control unit of the energy circulation control device is connected with at least one communication interface, and the communication interface is connected by means of at least one interconnected network to a remote control center, so as to allow the remote control center to perform remote monitoring and issuing a control instruction.

In the above fuel cell energy circulative utilization system according to the present invention, the communication interface to which the central control unit of the energy circulation control device is connected is formed of a wired/wireless communication interface.

The efficacy of the fuel cell energy circulative utilization system according to the present invention is that connection is made among the first electric cell, the second electric cell, and the energy circulation control device, and the energy circulation control device is operable to control electricity flow directions and energy input or output flow direction at the energy input terminal, the electricity output terminal, and the energy output terminal of the first electric cell and the electricity input terminal, the energy input terminal, and the energy output terminal of the second electric cell, so as to set the first electric cell and the second electric cell to a configuration in which one of the two is set as a solid oxide fuel cell, while the other one is set as a solid oxide electrolysis cell, whereby during the course of generating and supplying electricity for the solid oxide fuel cell, in case of off peak hours or occurrence of requirement for load lowering in respect of regulation of electricity, an extra amount of electricity and thermal energy resulting from loading lowering can be fed to the solid oxide electrolysis cell to have the second electric cell that is set as a solid oxide electrolysis cell outputting multiple types of resources or energies, such as hydrogen and oxygen, through the energy output terminal thereof. Further, such resources of hydrogen may be fed back to the first electric cell that is set as a solid oxide fuel cell through the energy input terminal thereof, or may alternatively be stored for subsequent use, so as to greatly reduce the supply amount of the input energy to which the energy input terminal of the first electric cell is connected. Further, the hydrogen that is fed back to the first electric cell to be used thereby is a type of green hydrogen, so as to achieve a further effect of energy saving and carbon reduction and enhancing the operation performance of the solid oxide fuel cell. Further, the first electric cell and the second electric cell can be controlled by a remote control center operable to control the energy circulation control device for adjusting and switching the first electric cell or the second electric cell in respect of the quantity thereof to be set as solid oxide electrolysis cells, or for adjusting and switching the first electric cell or the second electric cell in respect of quantity thereof as being set as the solid oxide electrolysis cell according to cost variation and value of electricity and hydrogen resources in the energy market, so as to effectively and flexibly regulate the generation, storage, and sales of electricity and hydrogen resources to thereby enhance the economic effect of industrial use and applications.

DETAILED DESCRIPTION OF THE PREFERRED EMBODIMENTS

Figure 1:
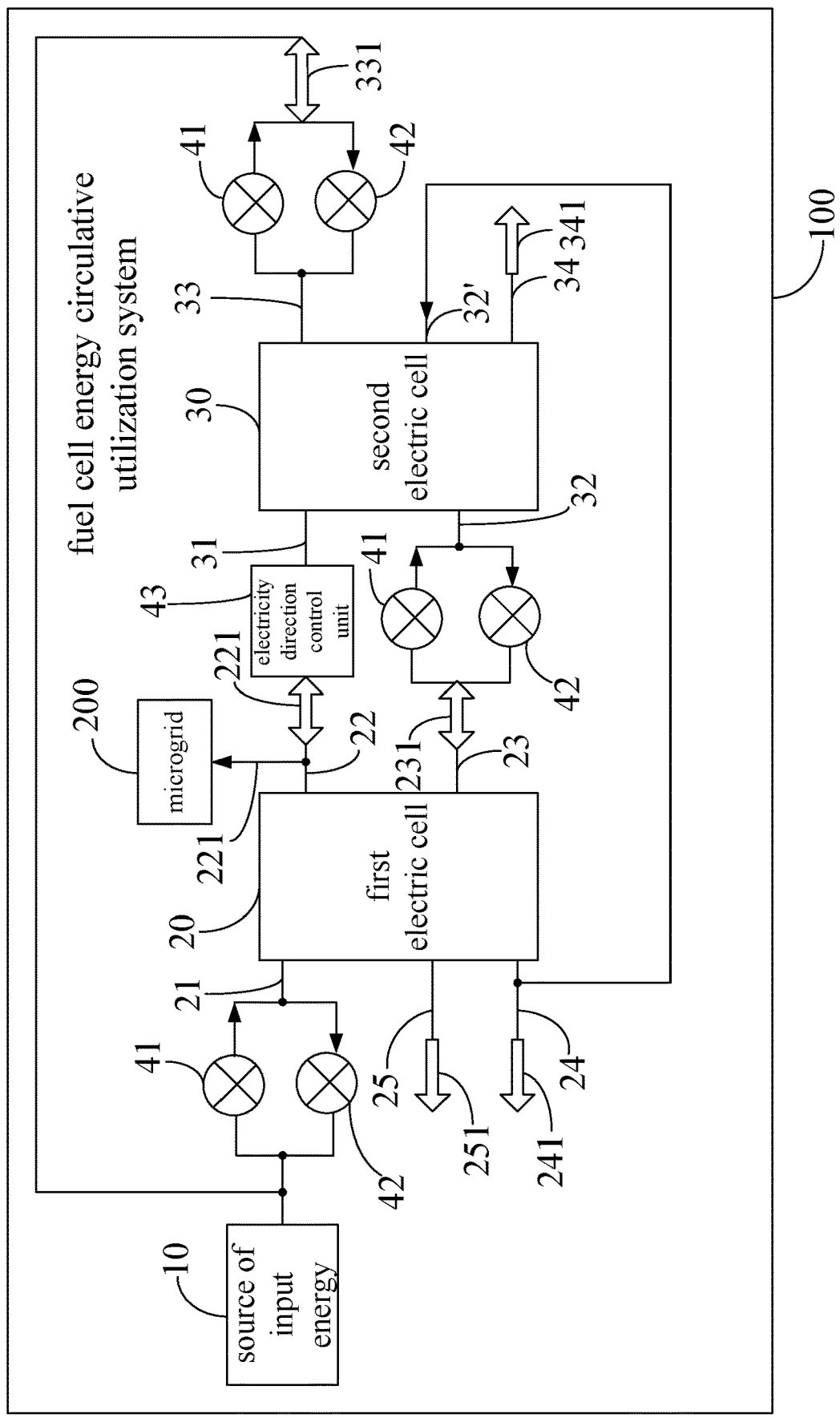
FIG. 1 is a block diagram illustrating a fuel cell energy circulative utilization system according to a first embodiment of the present invention.

Referring first to what depicted in FIG. 1, a first embodiment of a fuel cell energy circulative utilization system 100 is provided according to the present invention, in which the fuel cell energy circulative utilization system 100 comprises at least one source of input energy 10, which can be formed of an energy source containing hydrocarbon or hydrogen, such as a natural gas source, a biogas source, blue hydrogen, or green hydrogen, and in the first embodiment of the present invention, a hydrocarbon based natural gas source is taken as an example for illustration.

At least one first electric cell 20 is in the form of a solid oxide fuel cell (SOFC), but is not limited to any specific type. In the present invention, a solid oxide fuel cell power generation system from the BlueGen series of SolidPower company of Italy, BLOOM ENERGY company of USA, BOSCH company of Germany, or AVL company of Austria, is taken as example for illustration. Further, the first electric cell comprises at least one energy input terminal 21, an electricity output terminal 22, and at least one energy output terminal 23, 24, and 25, with the energy input terminal 21 being connected with the input energy 10, so that the electricity output terminal 22 may output generated electricity 221 and the energy output terminals 23, 24, and 25 respectively generate outputs of thermal energy 231, water 241, and carbon dioxide 251, and the electricity output terminal 22 is connected with at least one microgrid 200 to supply the electricity 221 to the microgrid 200.

At least one second electric cell 30 is not limited to any specific type, and in the first embodiment of the present invention, a solid oxide fuel cell power generation system from the BlueGen series of SolidPower company of Italy, BLOOM ENERGY company of USA, BOSCH company of Germany, or AVL company of Austria, is taken as example for illustration, and the second electric cell 30 is operable in the form of a solid oxide electrolysis cell (SOEC). The second electric cell 30 comprises at least one electricity input terminal 31, energy input terminals 32, 32', and energy output terminals 33, 34, wherein the electricity input terminal 31 and the energy input terminal 32, 32' are respectively connected with the electricity output terminal 22 and the energy output terminals 23, 24 of the first electric cell 20 to respectively input the electricity 221, the thermal energy 231, and the water 241 output from the first electric cell 20, so as to have the energy output terminals 33, 34 of the second electric cell 30 output hydrogen 331 and oxygen 341 and the hydrogen 331 output from the energy output terminal 33 is fed back to and connected to the energy input terminal 21 of the first electric cell 20, so that the energy input terminal 21 of the first electric cell 20 may receive the hydrogen 331 output from the energy output terminal 33 of the second electric cell 30 as resources feedback and for circulative utilization to thereby reduce the ratio of hydrogen input and loading capacity of the input energy 10.

Figure 2:
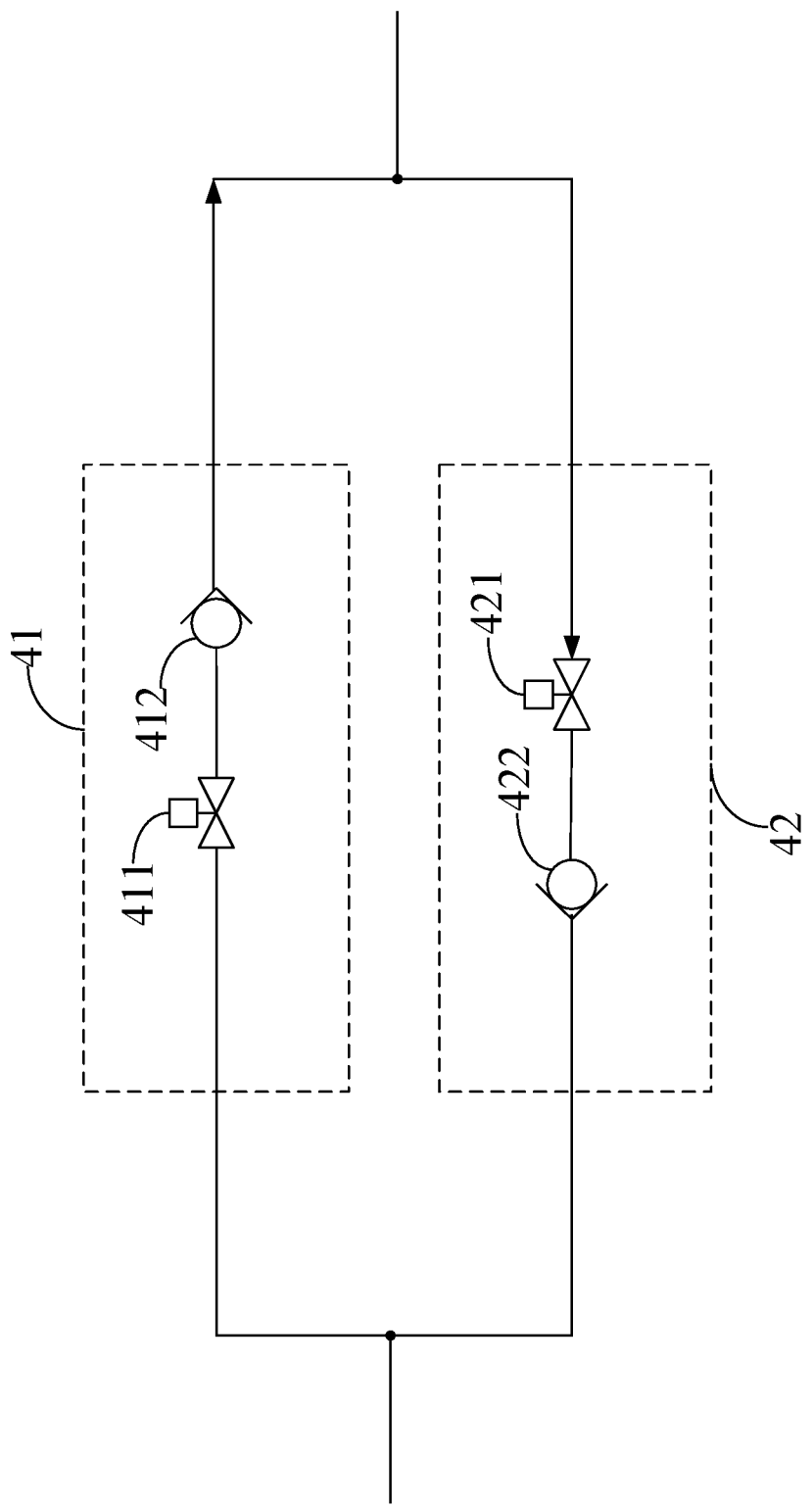
FIG. 2 is a diagram illustrating a first flow direction controller and a second flow direction controller of an energy circulation control device of the fuel cell energy circulative utilization system according to the present invention.
Figure 3:
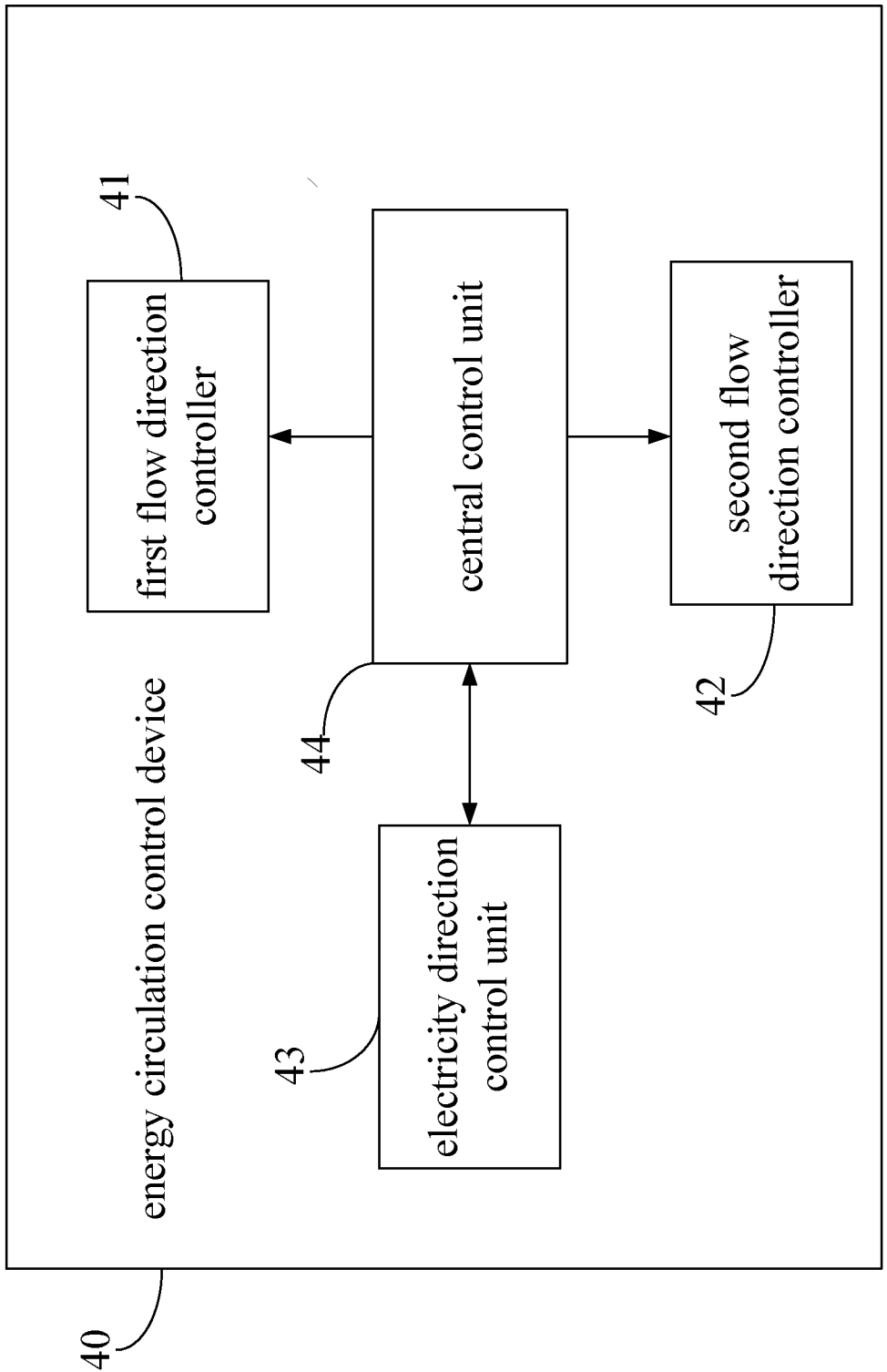
FIG. 3 is circuit block diagram of the energy circulation control device of the fuel cell energy circulative utilization system according to the present invention.

Further referring to what depicted in FIGS. 2 and 3, at least one energy circulation control device 40 is not limited to any specific type and an arrangement including at least one first flow direction controller 41, a second flow direction controller 42, at least one electricity direction control unit 43, and at least one central control unit 44 is taken as an example for illustration, wherein the first flow direction controller 41 and the second flow direction controller 42 are arranged in a pairwise configuration as being connected in parallel between the energy input terminal 21 and the energy output terminal 23 of the first electric cell 20 and the energy input terminal 32 and the energy output terminal 33 of the second electric cell, and further, the first flow direction controller 41 and the second flow direction controller 42 are arranged to control flow in directions that are opposite directions, and the first flow direction controller 41 and the second flow direction controller 42 that are pairwise arranged and parallel connected have opening and closing logics that are opposite, namely being similar to an exclusive OR gate, so that one is open while the other is closed.

The above-described first flow direction controller 41 is not limited to any specific type, and in the present invention, an arrangement including at least one first electromagnetic valve 411 and a first non-return valve 412 that are connected in series is taken as an example for illustration, and also, the above-described second flow direction controller 42 is not limited to any specific type, and in the present invention, an arrangement including at least one second electromagnetic valve 421 and a second non-return valve 422 that are connected in series is taken as an example for illustration. The first electromagnetic valve 411, the first non-return valve 412, the second electromagnetic valve 421, and the second non-return valve 422 are all formed of anti-explosion valve devices.

The electricity direction control unit 43 is connected between the electricity output terminal 22 of the first electric cell 20 and the electricity input terminal 31 of the second electric cell 30, so that a flow direction of electricity is controlled to be an electricity (current) flowing direction between the electricity output terminal 22 of the first electric cell 20 and the electricity input terminal 31 of the second electric cell 30.

The central control unit 44 is electrically connected with the first electromagnetic valve 411 of the first flow direction controller 41, the second electromagnetic valve 421 of the second flow direction controller 42, and the electricity direction control unit 43 to individually control the first flow direction controller 41, the second flow direction controller 42, and the electricity direction control unit 43 in respect of flow directions of energy input and output and flow direction of electricity, so as to switch and control the first electric cell 20 and the second electric cell 30 to inter-switch the working mode of a solid oxide electrolysis cell or a solid oxide fuel cell working state. For example, through control by the central control unit 44, the second electric cell 30, which was originally operating in a SOEC working mode, is so changed that the electricity flow direction of the electricity direction control unit 43 that is connected with the electricity input terminal 31 is changed from an input electricity (current) flow direction to an output electricity flow direction, and also, for those connected with the energy input terminal 32, the first flow direction controller 41 that was originally in an open state is closed and the second flow direction controller 42 that was originally in a closed state is opened so as to switch to a flow direction for output; and for those connected with the energy output terminal 33, the second flow direction controller 42 that was originally in an open state is closed and the first flow direction controller 41 that was originally in a closed state is opened so as to switch to a flow direction for input, and consequently, the hydrogen energy source of the input energy 10 can be supplied, in an opposite direction, to the energy output terminal 33 of the second electric cell 30, so that the second electric cell 30 is switched to a SOFC working mode as that for the first electric cell 20, and thus, the electricity input terminal 31 is switched to outputting electricity for electricity generated thereby for being connected in parallel with the electricity output terminal 22 of the first electric cell 20 to output electricity 221 to the microgrid 200. Similarly, the first electric cell 20 is also controllable and operable by the central control unit 44 for flowing in opposite directions and electricity flow direction set for the first flow direction controller 41, the second flow direction controller 42, and the electricity direction control unit 43, for switchability to a SOEC working mode, details concerning switchability and timing of working mode switch being provided in details hereinafter.

Figure 4:
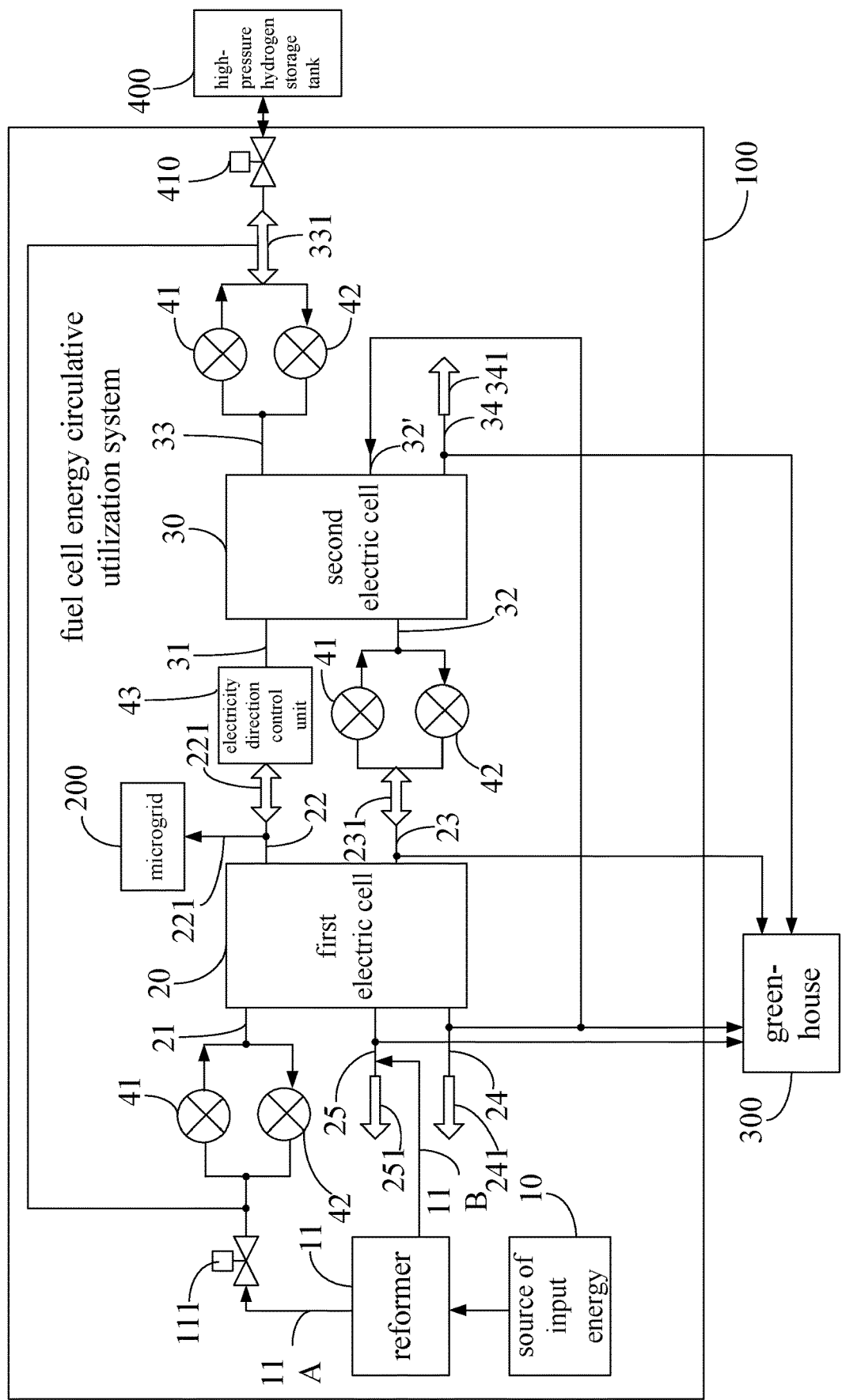
FIG. 4 is a diagram illustrating a fuel cell energy circulative utilization system according to a second embodiment of the present invention.

Further referring to what depicted in FIG. 4, a second embodiment of the fuel cell energy circulative utilization system 100 according to the present invention is provided, wherein the input energy 10 is shown in the form of an energy source containing hydrocarbons, such as natural gas or biogas, and the input energy 10 is connected with at least one reformer 11. The reformer 11 is provided with a first output terminal 11A and a second output terminal 11B, so that the reformer 11 is operable to separate the input energy 10 that contains hydrocarbons, such as natural gas or biogas, into hydrogen 331 and carbon dioxide 251 to be respectively output from the first output terminal 11A and the second output terminal 11B. The first output terminal 11A of the reformer 11 is connected with at least one input control valve 111, wherein one end of the input control valve 111 is connected with an end of the parallel connected first flow direction controller 41 and second flow direction controller 42 that is connected with the energy input terminal 21 of the first electric cell 20, in order to control whether or not the hydrogen 331 of the first output terminal 11A of the reformer 11 flows through the first flow direction controller 41 and the energy input terminal 21 to feed into the first electric cell 10, and further, the second output terminal 11B of the reformer 11 is connected with the energy output terminal 25 of the first electric cell 20 to jointly output carbon dioxide 251, and further, the energy output terminals 23, 24, and 25 of the first electric cell 20 and the energy output terminal 34 of the second electric cell 30 are connected with at least one greenhouse 300, for the purposes of supplying and using the multiple energy sources of thermal energy 23, water 241, carbon dioxide 251, and oxygen 341 output from the energy output terminal 23, 24 and 25, the second output terminal 11B of the reformer 11, and the energy output terminal 34 of the second electric cell 30 to and in the greenhouse 300. Further, at least one pairwise arranged and parallel connected combination of first flow direction controller 41 and second flow direction controller 42 of the energy circulation control device 40 that is connected with the energy output terminal 33 of the second electric cell 30 that outputs hydrogen 331 has one end connected with at least one high-pressure hydrogen storage tank 400. The high-pressure hydrogen storage tank 400 is provided with at least one anti-explosion electromagnetic valve 410 in order to control output of hydrogen 331 preserved therein. The anti-explosion electromagnetic valve 410 is similarly connected to and controllable by the central control unit 44 of the energy circulation control device 40, in order to release the hydrogen source 331 at proper timing to feed back to the energy input terminal 21 of the first electric cell 10, and as such, the hydrogen source 331 can be temporarily stored and fed back for circulative utilization.

Figure 5:
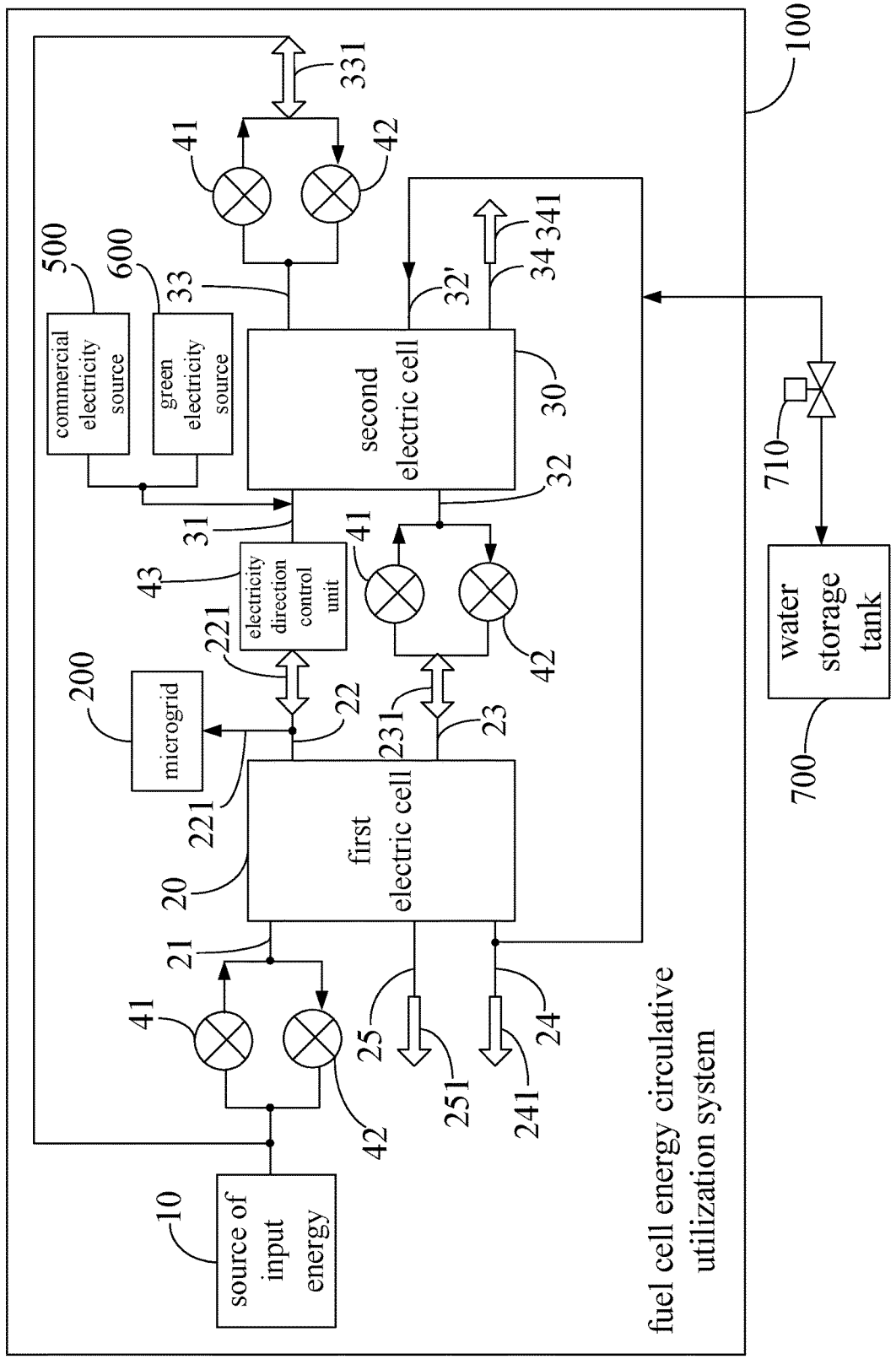
FIG. 5 is a diagram illustrating a fuel cell energy circulative utilization system according to a third embodiment of the present invention.
Figure 6:
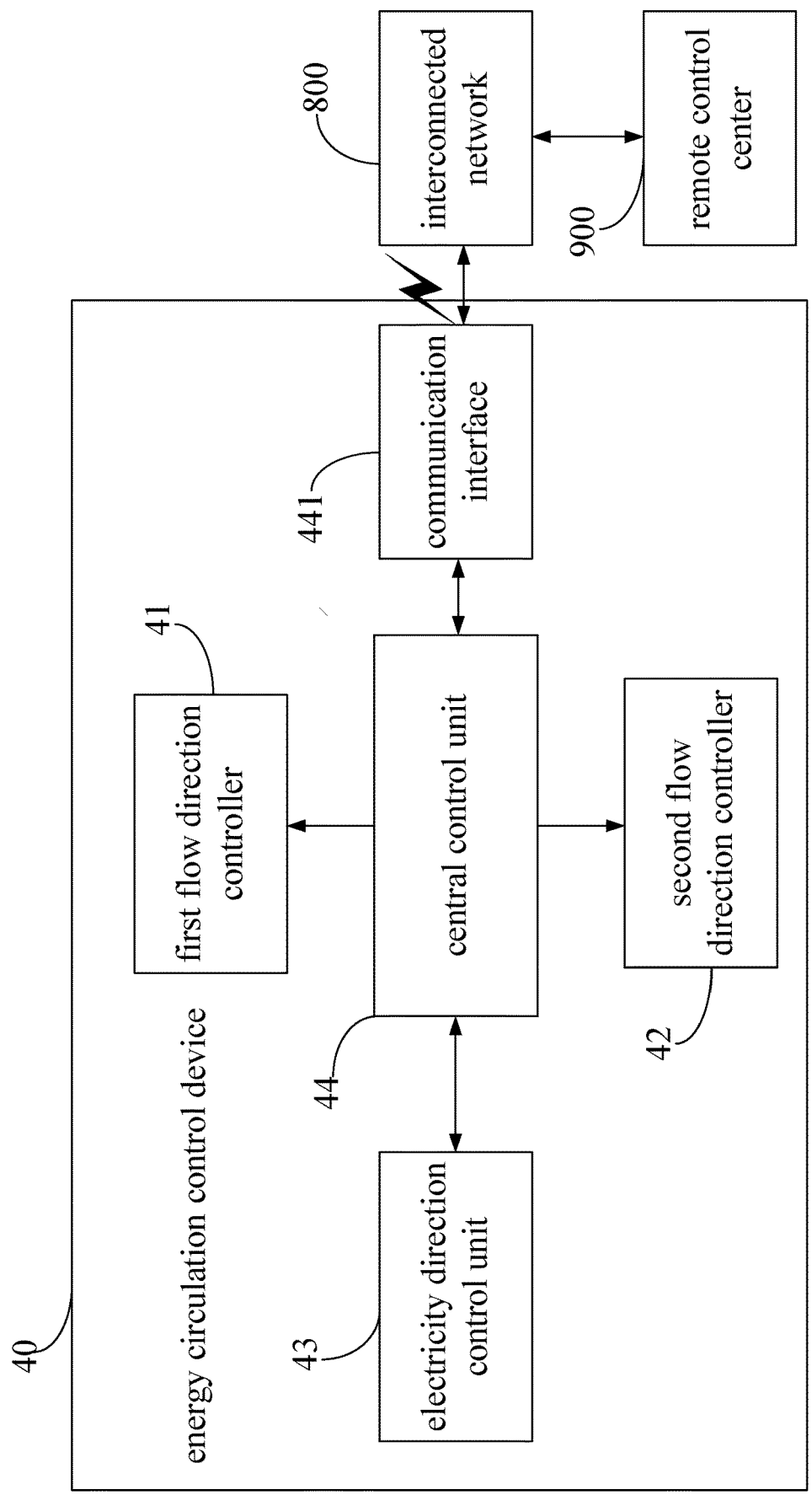
FIG. 6 is circuit block diagram of an energy circulation control device of the third embodiment shown in FIG. 5.

Further referring to what depicted in FIGS. 5 and 6, a third embodiment of the fuel cell energy circulative utilization system 100 according to the present invention is provided, wherein the electricity input terminal 32 of the second electric cell 30 is connected with at least one commercial (electric main) electricity source 500 and at least one renewable energy source 600, so that when the input energy 10 is of a cost that is higher than the electricity cost of the commercial electricity source 500 or the green electricity source 600, the commercial electricity source 500 or the renewable energy 600 may directed and fed to the electricity input terminal 32 of the second electric cell 30 to allow the energy output terminal 33 of the second electric cell 30 to generate hydrogen source 331 that is blue hydrogen or green hydrogen that is of a relatively low cost. Similarly, the first electric cell 10, when manipulated and controlled by the energy circulation control device 40 to switch to a SOEC working mode, could similarly achieve the same effect of generating a hydrogen source that is blue hydrogen or green hydrogen of a relatively low cost at the energy input terminal 21 of the first electric cell 20. Further, the energy input terminal 32' of the second electric cell 30 is connected with at least one water storage tank 700. The water storage tank 700 is provided with a control valve 710 to control supply of water 241 to the energy input terminal 32', so that when the first electric cell 20 is switched to the SOEC working mode, the water storage tank 700 supplies a necessary input of water 241 into the first electric cell 20 and the second electric cell 30 to allow both the first electric cell 20 and the second electric cell 30 to operate in the SOEC working mode to generate hydrogen source 331 of green hydrogen; or alternatively, when the second electric cell 30 is switched to the SOFC working mode, namely both the first electric cell 20 and the second electric cell 30 being in the SOFC working mode, the water storage tank 700 serves as a measure to allow water 241 output from the energy output terminal 24 of the first electric cell 20 and the energy input terminal 32' of the second electric cell 30 to store and accumulate in the water storage tank 700 for circulative utilization. The control valve 710 is also controllable by the central control unit 44 of the energy circulation control device 40. Further, the central control unit 44 of the energy circulation control device 40 is connected with at least one communication interface 441 (as shown in FIG. 6), and the communication interface 441 is connected, by at least one interconnected network 800, to a remote control center 900, so that the remote control center 900 may do remote monitoring and issue control instructions. The communication interface 441 is not limited to any specific type, and in the present invention, an arrangement formed of a wired/wireless communication interface is taken as an example for illustration, so that connection with the interconnected network 800 can be achieved in a wired manner or a wireless manner.

Figure 7:
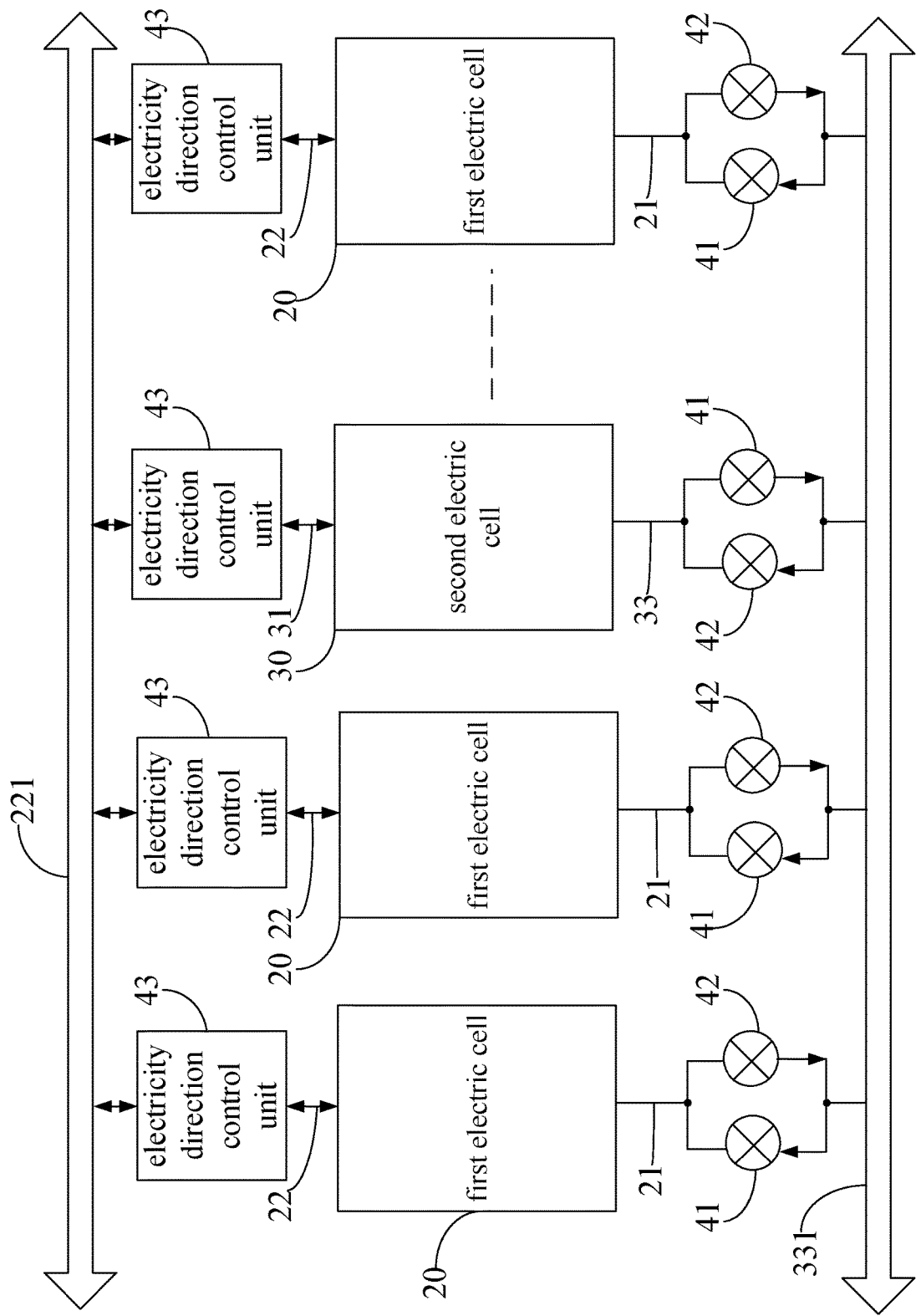
FIG. 7 is a diagram illustrating a preferred example of application of the fuel cell energy circulative utilization system according to the present invention.

Referring to what is depicted in FIG. 7, a preferred example of application of the fuel cell energy circulative utilization system 100 according to the present invention is provided, showing a configuration of connection of multiple first electric cells 20 and second electric cells 30, wherein connection of electricity 221 among the electricity output terminals 22 of the first electric cells 20 and the electricity input terminals 31 of the second electric cells 30 and connection of hydrogen source 331 among the energy output terminals 33 of the second electric cells 30 and the energy input terminals 21 of the first electric cells 20 are schematically shown. In the application of the fuel cell energy circulative utilization system 100 according to the present invention, an example involving the first two first electric cells 20 and one second electric cell 30 as shown in the drawing is taken for illustration, but not limited to such a numeral combination of the first electric cells 20 and the one second electric cell 30, wherein rated power generation or rated power consumption capacity for each of the first electric cells 20 and the one second electric cell 30 is 10 kilowatts (KW), and an example is provided by taking the operation performance of each first electric cell 20 as 60% and the operation performance of the second electric cell 30 as 80%, and then, the electricity output terminal 22 of the first electric cell 20 generating electricity 221 at 23.6 kilowatt-hours (KWH) would require an input of hydrogen 331 of one kilogram (Kg); and, the energy output terminal 33 of the second electric cell 30 generating one Kg hydrogen 331 requires an input of electricity 221 of 50-55 KWH, and thus, when the cost of electricity 221 available commercially is corresponding to the cost of hydrogen 331, 100% full-load operation for generation of electricity and green hydrogen with the above arrangement of two first electric cells 20 plus one second electric cell 30 may be taken for feedback and circulative utilization; however, when the cost of electricity 221 available commercially is higher than the cost of hydrogen 331, the central control unit 44 of the energy circulation control device 40 as described above may be used to control the electricity direction control unit 43 of the electricity input terminal 31 of the second electric cell 30 and the pairwise arranged first flow direction controller 41 and second flow direction controller 42 of the energy output terminal 33 so as to achieve a state that the flow direction of electricity 221 of the electricity input terminal 31 is switched to that for outputting and the flow direction of hydrogen 331 of the energy output terminal 33 is that for inputting, making the second electric cell 30 switched to the SOFC working mode, allowing the energy output terminal 33 of the second electric cell 30 to operate in a reversed or opposite direction for inputting of hydrogen 331 and the electricity input terminal 31 outputting electricity 221, to thereby form parallel connection, for generation of electricity, with the two first electric cells 20 that are in the SOFC working mode for full load operation to jointly generate and output electricity 221, and the electricity 221 may be regarded as green-energy electricity, which may be of a relatively high cost to thereby enhance the economic effect of the present invention in industrial uses.

Further, when the cost of hydrogen 331 available from the market is higher than that of electricity 221, in a similar way, the central control unit 44 of the energy circulation control device 40 as described above may individually control the electricity direction control units 43 of the electricity output terminals 22 of the two first electric cells 20 and the pairwise arranged first flow direction controller 41 and second flow direction controller 42 of the energy input terminal 21, so as to achieve a state that the flow direction of electricity 221 the electricity output terminal 21 is switched to that for inputting and the flow direction of hydrogen 331 of the energy input terminal 21 is outputting, making the two first electric cell 20 switched to the SOEC working mode, allowing the electricity output terminals 22 of the two first electric cells 20 to input electricity 221, and the energy input terminal 21 being made to operate in a reversed or opposite direction to output hydrogen 331 and thus forming parallel connection, for generation of hydrogen 331, with the second electric cell 30 operating in the SOEC working mode, namely generating an environmental friendly source of green hydrogen, and such a hydrogen source 331 of green hydrogen may thus receive a better commercial market price, meaning this helps further enhance the present invention in respect of value of industrial use and scope of application.

In the preferred example of application of the fuel cell energy circulative utilization system 100 according to the present invention shown in FIG. 7, control of the first flow direction controller 41, the second flow direction controller 42, and the electricity direction control unit 43 of the energy circulation control device 40 may be achieved by means of remote monitoring and control performed by the remote control center 900 to which the central control unit 44 is connected as shown in FIG. 6. In other words, there only needs the minimum amount of human labor and equipment cost to do cross-region or cross-area remote monitoring and remote control for the fuel cell energy circulative utilization system 100 of the present invention as described above that involves green electricity distributive powerplants or green hydrogen production plants. Further, the fuel cell energy circulative utilization system 100 according to the present invention is applicable to for example underwater electricity-based engine propulsive system of submarines and electricity and heat supply systems of hospitals, hotels, and office buildings, regional electricity charging stations or hydrogen filling stations for electric vehicles, small-sized community distributive power generation plants that require applications of circulative utilization for green electricity and green hydrogen.

In addition, in the preferred example of application of the fuel cell energy circulative utilization system 100 according to the present invention shown in FIG. 7, the energy circulation control device 40 can be operated by the remote control center 900 to adjust, according to seasonal characteristics of electricity generation and electricity demand for the commercial electricity source 500 and the renewable energy 600 as shown in FIG. 5 to control and adjust both of the first electric cell 20 and the second electric cell 30 both in respect of being set in the SOFC or SOEC working mode and quantity thereof, such as during summertime, electricity demand for resident household being such that electricity capacity demand for virtually full-load operation cannot be met by the commercial electricity source 500 and the renewable energy 600, and under such a condition, the cost of electricity is expensive and is higher than the cost of the input energy 10, then a control instruction is remotely issued from the remote control center 900 to the energy circulation control device 40 to switch a major portion of the first electric cells 20 and the second electric cells 30 to the SOFC working mode to generate, as full capacity, electricity 221, and the electricity may be sold to a power or utility company in the area where the commercial electricity source 500 is located, meaning electricity 221 is fed, as being parallel connected thereto, for electricity supply in the microgrid 200, and an extra amount of electricity 221 may be subject to regulation and control by the power or utility company in the area where the commercial electricity source 500 is located to feed to a neighborhood electric grid to thereby provide the best economic performance of power generation and industrial use. Further, during wintertime, the demand of electricity for the resident households drops, and under such a condition, the cost of electricity is cheap and lower than that of the input energy 10, meaning the cost of the natural gas or hydrogen 331 for the input energy 10 is higher than the cost of electricity 22, namely electricity 221 becomes cheap, and under such a condition, the remote control center 900 issues, from a remote site, a control instruction to the energy circulation control device 40 to switch a major portion of first electric cells 20 and second electric cells 30 to the SOEC working mode to generate, as full capacity, sources such as hydrogen 331, and storage is made in the high-pressure hydrogen storage tank 400 for sales to the market for making more profits to thereby further enhance the present invention in respect of circulative utilization of energy and economic value of industrial use.

Similarly, the above-described way of the remote control center 900 issuing a control instruction from a remote site to the energy circulation control device 40 to switch the first electric cell 20 and the second electric cell 30 to the SOEC or SOEC working mode is also applicable to a user end, such as user of the microgrid 200, for regulation and adjustment of the input energy 10 in respect of electricity 221 and hydrogen 331 so short intervals of time during peak time and off-peak time of electricity consumption periods, so as to achieve, in a precise manner, daily control and regulation of high economic performance for the input energy 10 of electricity 221 and hydrogen 331.

The fuel cell energy circulative utilization system 100 according to the present invention is provided in what shown in FIGS. 1-7, in which the description and drawings are provided for easy explanation of the technical contents and technical measures of the present invention, and the preferred embodiments so described provide only a fraction of the present invention and are not provided as limitative examples, and further any equivalent substitute and modification of structure and component of the details of the present invention are considered failing within the scope of the present invention as defined solely by the appended claims.

What is claimed is:

1. A fuel cell energy circulative utilization system, comprising:
   at least one input energy, which is an energy source containing hydrocarbons or hydrogen;
   at least one first electric cell, the first electric cell comprising at least one energy input terminal, an electricity output terminal, and at least one energy output terminal, the energy input terminal being connected with the input energy, so as to have the electricity output terminal generating and outputting electricity and to have the energy output terminal generating and outputting thermal energy and water;

at least one second electric cell, the second electric cell comprising at least one electricity input terminal, an energy input terminal, and an energy output terminal, the electricity input terminal and the energy input terminal being respectively connected with the electricity output terminal and the energy output terminal of the first electric cell to respectively input the electricity and the thermal energy and water output from the first electric cell so as to have the energy output terminal of the second electric cell output at least a hydrogen source; and at least one energy circulation control device, the energy circulation control device being connected among the electricity output terminal and the energy output terminal of the first electric cell and the electricity input terminal, the energy input terminal, and the energy output terminal of the second electric cell, in order to manipulate and control the hydrogen source output from the energy output terminal of the second electric cell for feeding back to the energy input terminal of the first electric cell, the energy circulation control device being operable for controlling and switching the first electric cell and the second electric cell between working modes as a solid oxide electrolysis cell (SOEC) or a solid oxide fuel cell (SOFC).

2. The fuel cell energy circulative utilization system according to claim 1, wherein the input energy is formed of a natural gas source.

3. The fuel cell energy circulative utilization system according to claim 1, wherein the input energy is formed of a biogas source.

4. The fuel cell energy circulative utilization system according to claim 1, wherein the input energy is formed of a blue hydrogen source.

5. The fuel cell energy circulative utilization system according to claim 1, wherein the input energy is formed of a green hydrogen source.

6. The fuel cell energy circulative utilization system according to claim 1, wherein the input energy comprises a source containing hydrocarbons and is connected with at least one reformer, the reformer comprising a first output terminal and a second output terminal, wherein the reformer is operable to separate the input energy that contains hydrocarbons into hydrogen and carbon dioxide to be respectively output through the first output terminal and the second output terminal, the first output terminal of the reformer being connected with at least one input control valve, the input control valve having an end connected with one end of the energy circulation control device connected with the energy input terminal of the first electric cell to control the hydrogen output from the first output terminal of the reformer to flow through the energy circulation control device and the energy input terminal of the first electric cell to input into the first electric cell or not, one energy output terminal of the first electric cell outputting carbon dioxide, the second output terminal of the reformer being connected with the energy output terminal of the first electric cell that outputs carbon dioxide to jointly output carbon dioxide.

7. The fuel cell energy circulative utilization system according to claim 1, wherein the first electric cell is formed of a SOFC, and the first electric cell is operable in the SOFC working mode.

8. The fuel cell energy circulative utilization system according to claim 1, wherein the electricity output terminal of the first electric cell is connected with at least one microgrid.

9. The fuel cell energy circulative utilization system according to claim 1, wherein the energy output terminal of the first electric cell outputs carbon dioxide.

10. The fuel cell energy circulative utilization system according to claim 1, wherein each energy output terminal of the first electric cell is connected with at least one greenhouse to supply sources of thermal energy, water, and carbon dioxide output through the energy output terminal into the greenhouse.

11. The fuel cell energy circulative utilization system according to claim 1, wherein the second electric cell is formed of a SOFC and the second electric cell is operable in the SOEC working mode.

12. The fuel cell energy circulative utilization system according to claim 1, wherein the electricity input terminal of the second electric cell is connected with at least one commercial electricity source.

13. The fuel cell energy circulative utilization system according to claim 1, wherein the electricity input terminal of the second electric cell is connected with at least one renewable energy source.

14. The fuel cell energy circulative utilization system according to claim 13, wherein the renewable energy source with which the electricity input terminal of the second electric cell is connected is formed of at least one of solar panel generated electricity source, wind power generation electricity source, hydraulic power generation electricity source, geothermal power generation electricity source, and tidal power generation electricity source.

15. The fuel cell energy circulative utilization system according to claim 1, wherein the energy input terminal of the second electric cell is connected with at least one water storage tank, and the water storage tank is provided with a control valve to control supply of water to the energy input terminal of the second electric cell.

16. The fuel cell energy circulative utilization system according to claim 1, wherein the energy output terminal of the second electric cell outputs oxygen, and the energy output terminal is connected with at least one greenhouse to supply the oxygen source output from the energy output terminal to the greenhouse.

17. The fuel cell energy circulative utilization system according to claim 1, wherein the energy circulation control device comprises:

at least one first flow direction controller and second flow direction controller, the first flow direction controller and the second flow direction controller being arranged pairwise and connected in parallel between the energy input terminal and the energy output terminal of the first electric cell and the energy input terminal and the energy output terminal of the second electric cell, the first flow direction controller and the second flow direction controller being operable to control flow directions in opposite directions so as to control flow directions at the energy input terminal and the energy output terminal of the first electric cell and the energy input terminal and the energy output terminal of the second electric cell for inputting or outputting;

at least one electricity direction control unit, which is connected between the electricity output terminal of the first electric cell and the electricity input terminal of the second electric cell, in order to control a flow direction of electricity to be a flow direction of electricity between the electricity output terminal of the first electric cell and the electricity input terminal of the second electric cell; and at least one central control unit, which is electrically connected with the first flow direction controller, the second flow direction controller, and the electricity direction control unit, in order to control flow directions of energy of the first flow direction controller, the second flow direction controller, and the electricity direction control unit for inputting or outputting and a flow direction of electricity, so as to individually control and switch the first electric cell and the second electric cell to the SOEC or SOFC working mode.

18. The fuel cell energy circulative utilization system according to claim 17, wherein the first flow direction controller of the energy circulation control device comprises at least one first electromagnetic valve and a first non-return valve connected in series.

19. The fuel cell energy circulative utilization system according to claim 17, wherein the second flow direction controller of the energy circulation control device comprises at least one second electromagnetic valve and a second non-return valve connected in series.

20. The fuel cell energy circulative utilization system according to claim 17, wherein at least one pairwise arranged and parallel connected first flow direction controller and second flow direction controller of the energy circulation control device that is connected with the energy output terminal of the second electric cell that outputs hydrogen has an end connected to at least one high-pressure hydrogen storage tank.

21. The fuel cell energy circulative utilization system according to claim 20, wherein the high-pressure hydrogen storage tank to which the end of at least one pairwise arranged and parallel connected first flow direction controller and second flow direction controller of the energy circulation control device that is connected with the energy output terminal of the second electric cell that outputs hydrogen is connected is provided with at least one anti-explosion electromagnetic valve.

22. The fuel cell energy circulative utilization system according to claim 17, wherein the pairwise arranged and parallel connected first flow direction controller and second flow direction controller of the energy circulation control device have logics of opening/closing that are opposite to each other so as to be similar to an exclusive-OR gate (XOR gate) of electronics.

23. The fuel cell energy circulative utilization system according to claim 17, wherein the central control unit of the energy circulation control device is connected with at least one communication interface, and the communication interface is connected by means of at least one interconnected network to a remote control center, so as to allow the remote control center to perform remote monitoring and issuing a control instruction.

24. The fuel cell energy circulative utilization system according to claim 23, wherein the communication interface to which the central control unit of the energy circulation control device is connected is formed of a wired/wireless communication interface.

* * * * *